United States Patent
Gerhardt et al.

[19]

[11] Patent Number: 5,842,666
[45] Date of Patent: Dec. 1, 1998

[54] LAMINAR SUPERSONIC TRANSPORT AIRCRAFT

[75] Inventors: Heinz Adolf Gerhardt, Redondo Beach; James Franklin Kerswell, Los Angeles; Richard Thomas Priestley, La Quinta, all of Calif.; Berry Thomas Gibson, Kennesaw, Ga.

[73] Assignee: Northrop Grumman Coporation, Los Angeles, Calif.

[21] Appl. No.: 805,034

[22] Filed: Feb. 21, 1997

[51] Int. Cl.⁶ .............................. B64C 3/10; B64D 27/02
[52] U.S. Cl. .................. 244/15; 244/45 R; 244/45 A; 244/214; 244/55; 244/204; D12/332; D12/341
[58] Field of Search .............................. 244/15, 55, 45 R, 244/35 A, 204, 211, 212, 213, 214, 215, 219, 45 A, 117 A; D12/331, 332, 341, 343

[56] References Cited

U.S. PATENT DOCUMENTS

| | | | |
|---|---|---|---|
| 3,047,255 | 7/1962 | Wallis | 244/55 |
| 3,064,928 | 11/1962 | Toll . | |
| 3,155,344 | 11/1964 | Vogt . | |
| 3,288,400 | 11/1966 | Nazir . | |
| 3,447,761 | 6/1969 | Whitener et al. . | |
| 3,698,668 | 10/1972 | Cole | 244/219 |
| 3,776,489 | 12/1973 | Wen et al. . | |
| 4,008,867 | 2/1977 | Kaniut . | |
| 4,053,124 | 10/1977 | Cole | 244/219 |
| 4,113,210 | 9/1978 | Pierce | 244/219 |
| 4,194,708 | 3/1980 | Tracy et al. . | |
| 4,351,502 | 9/1982 | Statkus | 244/214 X |
| 5,322,242 | 6/1994 | Tracy . | |
| 5,518,204 | 5/1996 | Tracy | 244/35 A X |
| 5,538,201 | 7/1996 | Gerhardt | 244/45 R X |

FOREIGN PATENT DOCUMENTS

WO 94/11248   5/1994   WIPO .................................... 244/55

*Primary Examiner*—William Grant
*Attorney, Agent, or Firm*—Terry J. Anderson; Karl J. Hoch, Jr.

[57] ABSTRACT

The present invention is a laminar supersonic transport aircraft having a reverse delta wing located between a forward section and a distal end of the aircraft, a set of jet engines superposed on another set of jet engines, a stabilizing vertical tail located near the distal end of the aircraft, a stabilizing canard surface located near the forward section of said aircraft. Also, a laminar flow control device can be incorporated within the wing. The reverse delta aerodynamic wing has a basic reverse delta wing portion bounded by a leading edge and by a pair of trailing edges extending from respective ends of the leading edge toward a trailing apex point and respective span-wise wing extensions in a natural laminar boundary layer wing region extending chordwise from the leading edge by a fraction of the chordlength of the wing and extending span-wise from opposing sides of said wing.

56 Claims, 6 Drawing Sheets

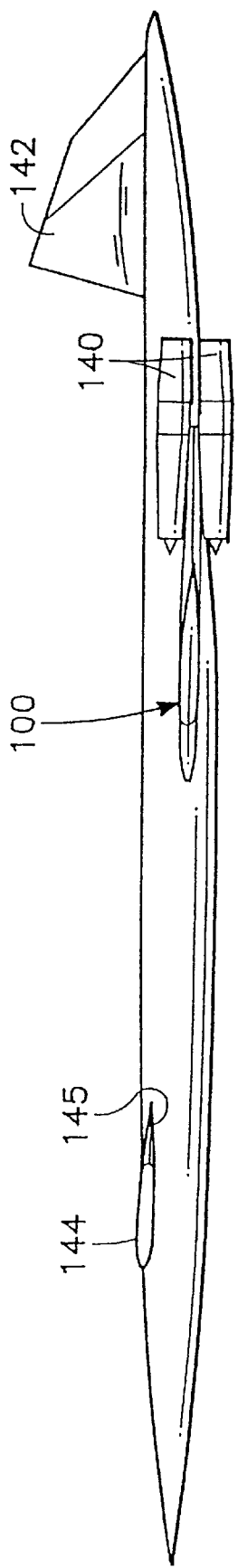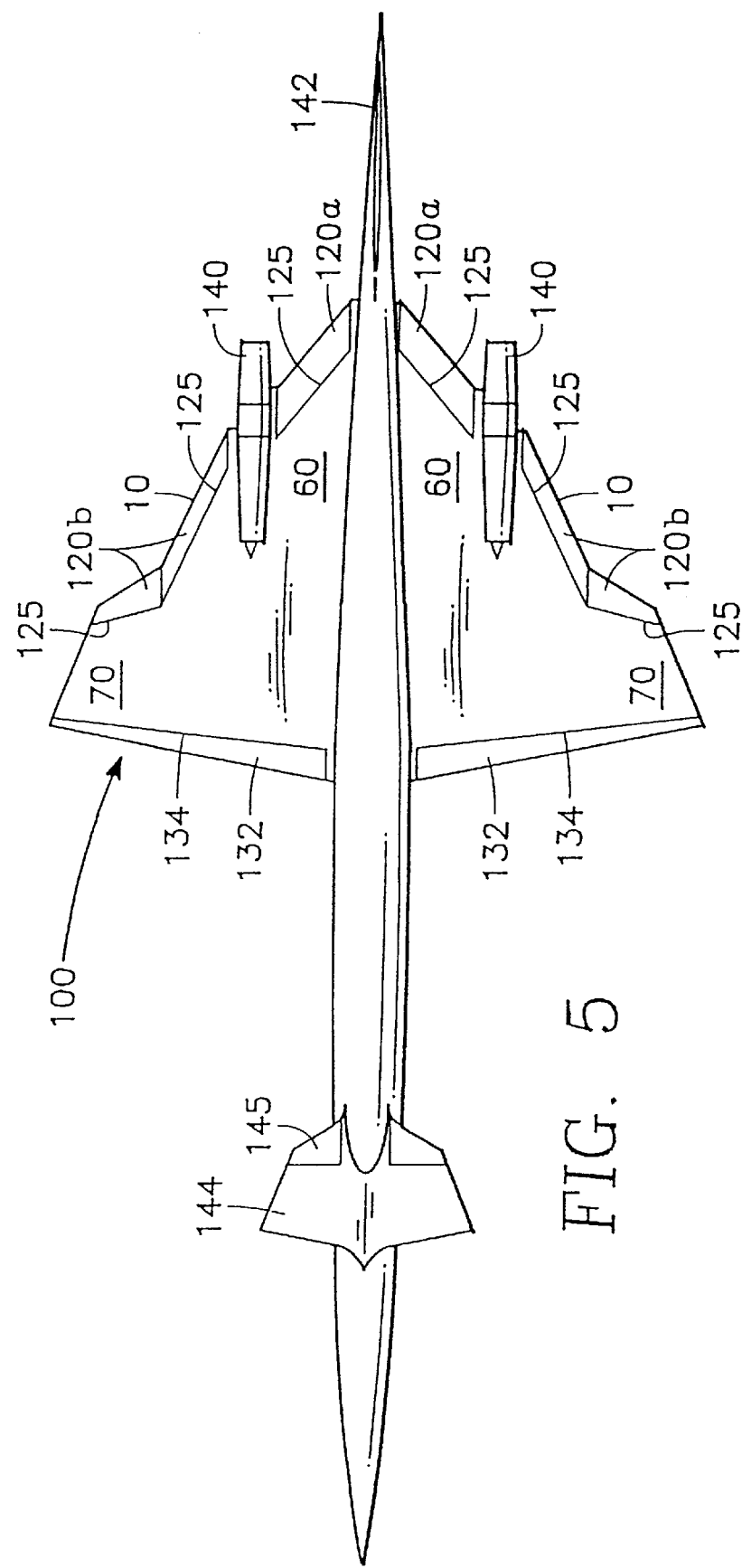

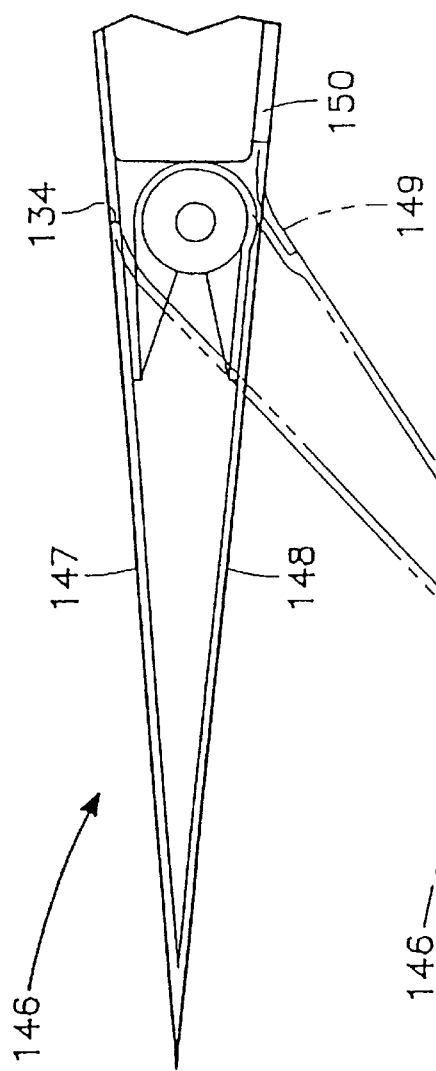
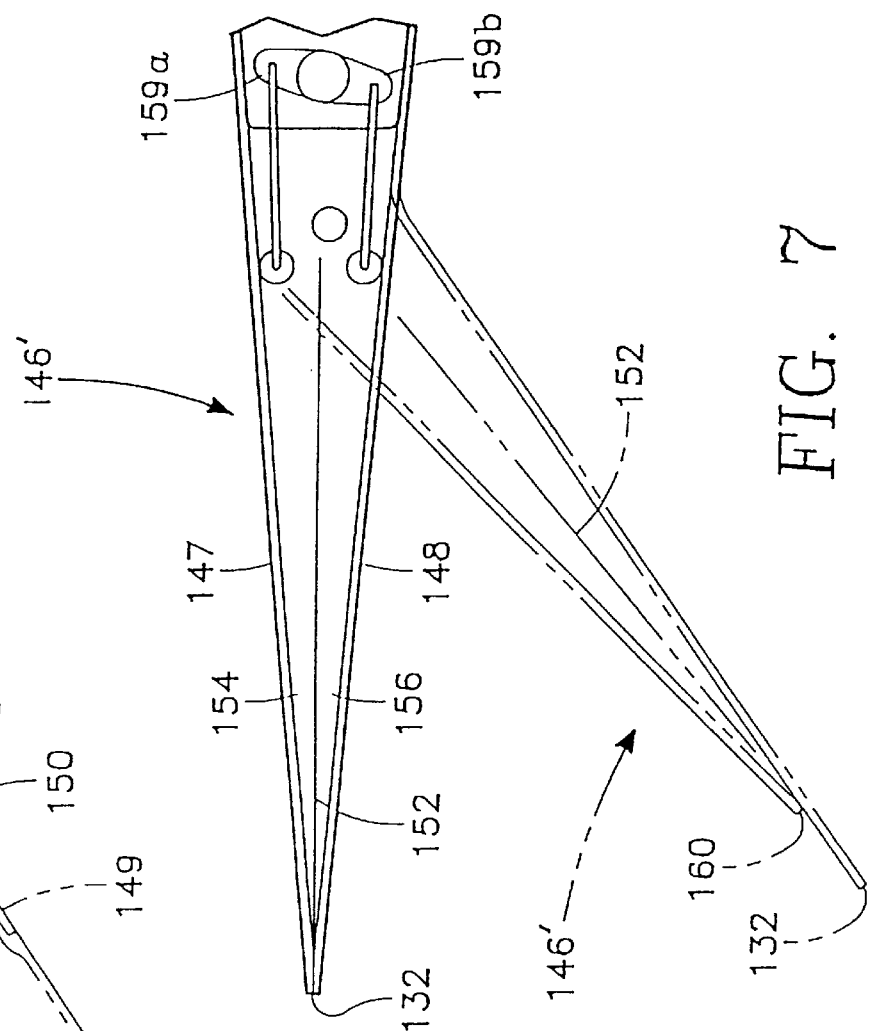
FIG. 6
FIG. 7

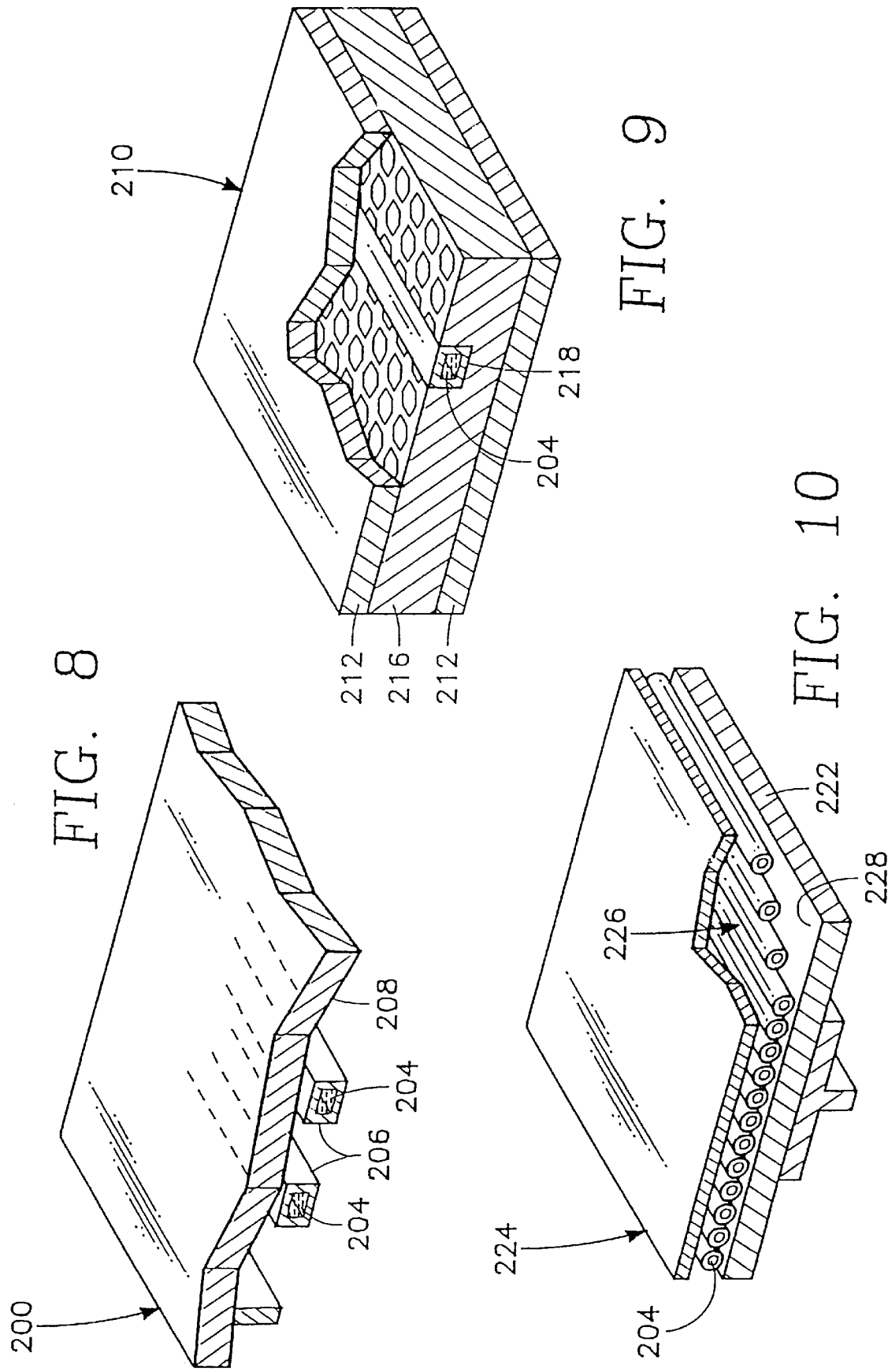

LAMINAR SUPERSONIC TRANSPORT AIRCRAFT

BACKGROUND OF THE INVENTION

1. Technical Field

The invention relates to supersonic flight vehicles equipped with reverse delta wings and modifications thereof for the purpose of achieving laminar flow over such wings.

2. Background Art

The supersonic aircraft configuration of the present invention is characterized by a modified reverse delta wing which is selected for its laminar-flow promoting attributes.

Laminar Flow

The achievement of laminar boundary layers is a significant step in reducing aerodynamic drag and thereby increasing the cruise performance of commercial and military aircraft.

Reverse Flow Aerodynamics and the Reverse Delta Wing

A delta wing is normally thought to be moving through a fluid in the direction its apex is pointing. However, a delta wing flying in reverse direction, i.e., a reverse delta wing, has certain favorable aerodynamic characteristics which can be exploited for efficient supersonic flight. The reciprocal flow theorem for thin wings postulates that the wave drag (due to thickness) of a wing remains unchanged by a reversal of the direction of motion. (The wave drag equality for the two wings has been substantiated.) Another premise from the reciprocal flow theorem is that the lift curve slope remains unchanged by flow reversal. Furthermore, provided the leading and trailing edges are supersonic, the drag-due-to-lift at supersonic speeds is the same. Early investigations into the aerodynamics of reverse delta wings were carried out by NACA in 1947.

Delta wing flowfields differ in certain important aspects for supersonic airstreams approaching from opposite directions. At a sufficiently high freestream Mach number, the Mach cones from the tips of the reverse delta wing are swept along or downstream of the trailing edges. Thus, since the wing lies outside each tip's zone of influence, the flow over the wing is nominally two-dimensional. Surface pressure contours from Euler calculations on conventional and reverse delta wings clearly show that changes in pressure occur in a much more regular and linear fashion on the reverse delta wing. More importantly, strong pressure gradients occur near the leading edges of the delta wing where they cause unfavorable conditions for boundary layer stability. On the reverse delta wing, the strong pressure gradients are confined to the trailing edge regions where they do not interfere with boundary layer development. Spanwise pressure gradients which cause boundary layer crossflow are likewise concentrated near the leading edge of the delta wing and near the trailing edge of the reverse delta wing. Crossflow and attachment line instabilities, the primary modes of transition on swept wings, are thus absent on the reverse delta. Both wings have favorable chordwise pressure gradients over most of their surfaces.

Supersonic Laminar Flow

The absence of pressure gradients near the leading edge and the favorable gradients downstream provide the reverse delta wing with ideal conditions for achieving natural laminar flow (NLF). The question then arises as to how much natural laminar flow is achievable. Even under ideal conditions, a laminar boundary layer will transition to turbulent flow upon reaching a certain Reynolds number. The transition Reynolds Number is much higher at supersonic speeds than at subsonic speeds. The unit Reynolds Number for flight conditions typical of high speed civil transport (HSCT) flight vehicles is Re/ft=1.75 million. NLF runs of the order of Re=30 to 40 million can be expected; in other words, laminar runs of 20 to 30% of the root chord may be achievable for a root chord length of the order of 100 feet.

A smaller airplane with a smaller reverse delta wing would operate at a smaller Reynolds Number and therefore experience laminar flow over a larger portion or most of the total surface of the wing planform.

Because of the receding width of a reverse delta wing, a 20% chord-wise run covers 35% of the wing area, a 30% chord-wise run covers 50% of the wing area. The receding width offers another geometric benefit: turbulent boundary layer wedges which might originate at the wing tip apices cannot affect the wing surface as the wing width recedes along a larger angle than the turbulence lateral spread half angle.

Conventional delta wings and their derivatives do not attain significant areas of natural laminar flow, because the crossflow in the leading edge region leads to boundary layer transition very close to the edge.

Laminar Flow Control

Natural laminar flow is not expected in the rear portions of the wing of a large supersonic transport aircraft even when equipped with reverse delta wings. Laminar flow can be maintained there, however, by applying laminar flow control (LFC) techniques. For conventional delta wings the LFC-by-suction technique has been proposed. In this approach, the laminar boundary layer is stabilized by sucking a small amount of the boundary layer through tiny holes or small slits in the wing skin into the interior of the wing. There it is collected in small ducts, whence it is channeled into larger ducts and finally expelled rearward into the atmosphere. A suction compressor acts as the power source to move the suction air. LFC by suction is effective in overcoming chordwise-propagating Tollmien-Schlichting wave disturbances and the spanwise cross flow instabilities.

LFC-by-suction requires porous wing skins, ducts in wing and fuselage and suction compressors. Air ducts in the wing replace fuel, ducts in the fuselage increase the airplane's cross-sectional area and thus its wave drag, and the suction compressors are large and heavy because they must operate in low density air at cruise altitude. And finally, energy is required to drive the compressors. Hence, weight, drag and energy penalties diminish the net advantage of LFC-by-suction considerably.

An alternate technique is LFC-by-cooling also known as thermal laminar flow control (TLFC). In TLFC, the wing skin is cooled from inside the wing by a fluid. LFC-by-cooling is quite effective in suppressing the growth of the Tollmien-Schlichting disturbances, but only marginally effective in suppressing the crossflow instabilities. Therefore, TLFC can be used expediently to extend the laminar flow coverage on reverse delta wings. Conventional delta wings can benefit from TLFC only when applied in combination with LFC-by-suction in the leading edge region.

Drag Due to Lift Characteristics

As pointed out above, the zero-lift wave drag of delta and reverse delta wings are the same. Also, if both wings have supersonic leading edges (i.e. if the sweep angle of the leading edge is smaller than the Mach angle), then the drag due to the lift factor, $K=C_{DL}/C_L^2$, is the same. However, delta wings can have subsonic leading edges (when the leading edge sweep angle is larger than the Mach angle) in which case leading edge thrust may be achievable which reduces drag due to lift on that wing. This benefit is not attainable by the reverse delta wing. The absence of the leading edge thrust benefit must be traded off against laminar flow benefits on the reverse delta wing.

In reality, a delta wing with subsonic leading edges is not a suitable planform for a high-speed civil transport (HSCT) configuration. Such a wing would have a very low aspect ratio, and hence its subsonic cruise performance (essential for flight over land) would be severely compromised. Therefore, HSCT wing planforms currently being considered have higher aspect ratios achieved by attaching outer wing panels of lower leading edge sweeps. Only a portion of the wing leading edge is then subsonic. That diminishes their leading edge thrust advantage, as the outer panels have supersonic leading edges.

The aspect ratio of reverse delta wings is likewise increased by adding outer wing panels. This does not detract from the desired two-dimensional flow character of such wings.

Trailing Edge Flaps

Deflected trailing edge flaps are primarily used to increase the lift of a wing at moderate angles of attack to ensure good takeoff and landing performance. Flaps along the unswept trailing edge of a conventional delta wing operate efficiently because their hingelines are basically normal to the flow. They also cause strong nose-down pitching moments because the lift increment produced by the flaps acts at a point far behind the center of gravity of the aircraft. This limits the usable deflection and the attendant lift increment substantially.

Trailing edge flaps with highly swept hingelines, such as would exist on a reverse delta wing, could be rather ineffective, as flap effectiveness theoretically diminishes in proportion to the cosine-squared of the sweep angle. However, since these flaps cause less of a nose-down pitching moment, large deflections can be utilized to make up for the lower lift increment at a given deflection. Furthermore, the flow over the highly deflected flaps has a diminished tendency to separate because of the high hingeline sweep.

Leading Edge Flaps

Currently, ordinary leading edge flaps used on aircraft are inconsistent with the attainment of laminar flow. This is because surface gaps and steps at the hingeline cause undesirable boundary layer transition.

Based on the above, there is therefore a need to increase the amount of natural laminar flow experienced by a large reverse delta wing. There is also need to induce greater laminar flow on a reverse delta wing using laminar flow control. In addition, there is a need to provide trailing edge flaps on a reverse delta wing without impairment of flap effectiveness due to the highly swept hingeline inherent in the reverse delta wing. Further, there is a need to provide a flap that avoids surface imperfections by providing continuous flexible skin segments at the hinge.

SUMMARY OF THE DISCLOSURE

The present invention is a laminar supersonic transport aircraft with a reverse delta aerodynamic wing including a basic reverse delta wing portion bounded by a leading edge and by a pair of trailing edges extending from respective ends of the leading edge toward a trailing apex point and respective span-wise wing extensions near the leading edge and extending span-wise from respective opposing sides of the wing. The wing is characterized by a laminar flow-to-turbulent flow transition boundary extending generally span-wise across the wing and located at a fraction of a root chord of the wing from the leading edge. This boundary defines a region of laminar flow between the transition boundary and the leading edge. A major portion of the spanwise wing extensions are located within the region of laminar flow, so that the extensions increase the amount of natural laminar flow experienced by the wing beyond what has been considered possible.

In one embodiment, the aft most portion of the trailing edges extend toward a point which is closer to the leading edge than the apex point, hereby to minimize surface area of the wing outside of the region of laminar flow. A portion of the wing contiguous with the trailing edges includes plural trailing edge flaps, there being respective hingelines at which respective ones of the flaps are rotatably connected to a remainder of the wing, the hingelines extending generally span-wise relative to the wing. Each of the trailing edges includes plural steps, each of the steps including a span-wise trailing edge portion and a chord-wise edge. The wing includes respective flaps at respective ones of the steps.

In order to mitigate the problem of reduced flap effectiveness with increasing hingeline sweep angle, one feature of the present invention are trailing edge flaps on the span extensions and on the inboard trailing edge in which hingeline sweep is reduced consistent with the reduced trailing edge sweep angle of these wing segments. The trailing edge flaps of the span extensions also act as ailerons to provide roll control.

In addition, in another embodiment, the aircraft includes plural engines, control surfaces, such as a foreplane (a stabilizing canard surface) and a stabilizing vertical tail, and a seamless leading edge flap. The wing and stabilizing vertical tail employ the concept of the Reverse Delta Wing to promote the establishment of laminar flow over the surface. Plural superposed engines eliminate interactions between engines due to an "inlet unstart". Also, possible damage to the engines by debris kicked up by the landing gear during takeoffs and landings is reduced. The canard control surface produces a smaller aerodynamic center shift between subsonic and supersonic flight than a conventional horizontal tail. The seamless flap, when deflected, provides a higher lift/drag ratio for efficient takeoff and climb. At supersonic flight it is undeflected and produces a seamless and very smooth surface to maintain natural laminar flow at cruise conditions. This effectively eliminates any surface steps or gaps in the area of desired laminar flow.

It is a realization by the inventor herein that the reverse delta wing and its derivatives, given their lack of spanwise pressure gradients, are well-suited to benefit from LFC-by-cooling, unlike the conventional delta wing. One preferred feature of the present invention is to employ fuel as the LFC coolant in a reverse delta wing. With fuel as the heat sink available throughout much of the interior of the wing, the implementation poses no major technical obstacles. Additionally, the fuel may be pre-cooled on the ground before flight to increase its effectiveness as an LFC coolant.

The surfaces of an aircraft flying at supersonic speeds are subject to aerodynamic heating. Depending upon the specific flight Mach number, skin temperatures are reached at which standard aircraft structural materials such as aluminum alloys lose their strength. Therefore, high temperature materials such as titanium must be considered which, because of their lower specific strength, entail severe weight penalties. These materials also cost more and are more difficult to process in the manufacturing stage. Substantial economic benefits accrue if, by means of cooling the skin, the use of standard structural materials can be continued. Note that cooling of the skin (on a supersonic aircraft) for the purpose of material substitution is only feasible in conjunction with laminar flow. In case of turbulent flow, the heat transfer rates from air to skin are an order of magnitude higher, making the fuel heat sink capacity inadequate.

An additional benefit of LFC-by-cooling in a reverse delta wing is that the cooled wing surface is less likely to form surface waves from heat expansion. The absence of waves is a pre-condition for maintaining a laminar boundary layer obtained actively or passively.

There are synergistic benefits obtained from cooling the wing surface to achieve laminar flow. Not only is the friction drag reduced by an order of magnitude as compared to turbulent flow, the heat transfer from air to skin is reduced by an order of magnitude as well (as compared to heat transfer by turbulent boundary layers). This means that the heat sink capacity of the fuel required is comparatively small, a significant advantage. Thus, there is a three-way synergism: cooling achieves laminar flow—laminar flow makes cooling feasible—laminar flow reduces drag.

BRIEF DESCRIPTION OF THE DRAWINGS

FIG. 4 is a simplified side view of a flight vehicle including a wing, plural engines, a canard, and a seamless leading edge flap.

FIG. 5 is a simplified top view of a flight vehicle including a wing, plural engines, a canard, and a seamless leading edge flap.

FIG. 6 illustrates one embodiment of the seamless leading edge flap in accordance with the present invention.

FIG. 7 illustrates another embodiment of the seamless leading edge flap in accordance with the present invention.

FIG. 8 illustrates one embodiment of a cooling system used in accordance with the present invention.

FIG. 9 illustrates a second embodiment of a cooling system used in accordance with the present invention.

FIG. 10 illustrates a third embodiment of a cooling system used in accordance with the present invention.

DETAILED DESCRIPTION OF THE PREFERRED EMBODIMENTS

Reverse Delta Wing Performance

Figure 1:
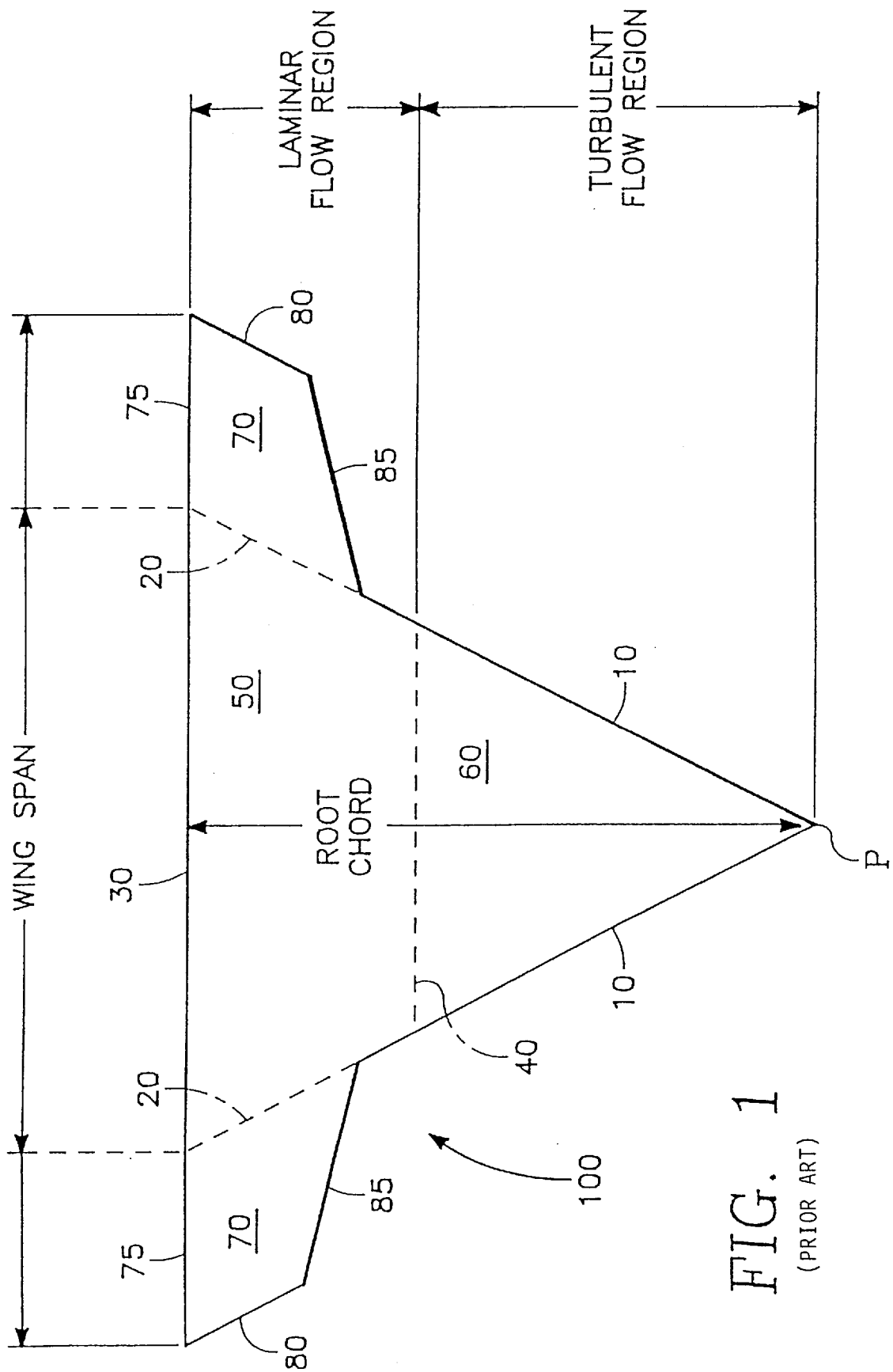
FIG. 1 is a plan view of an aerodynamic reverse delta wing including span-wise extensions in a laminar flow region of the wing in accordance with a first embodiment of the invention.

Referring to FIG. 1, a reverse delta wing 100 has a simple triangular shape including trailing edges 10 converging at a trailing point P at the rear and continuing forward along the dashed lines 20 to a leading edge area 30. The basic reverse delta wing 100 has sonic trailing edges 10, i.e. the sweep angle of the trailing edges 10 is such that the free-stream velocity component perpendicular to the trailing edges 10 correspond to a Mach number equal to 1.0.

Figure 3:
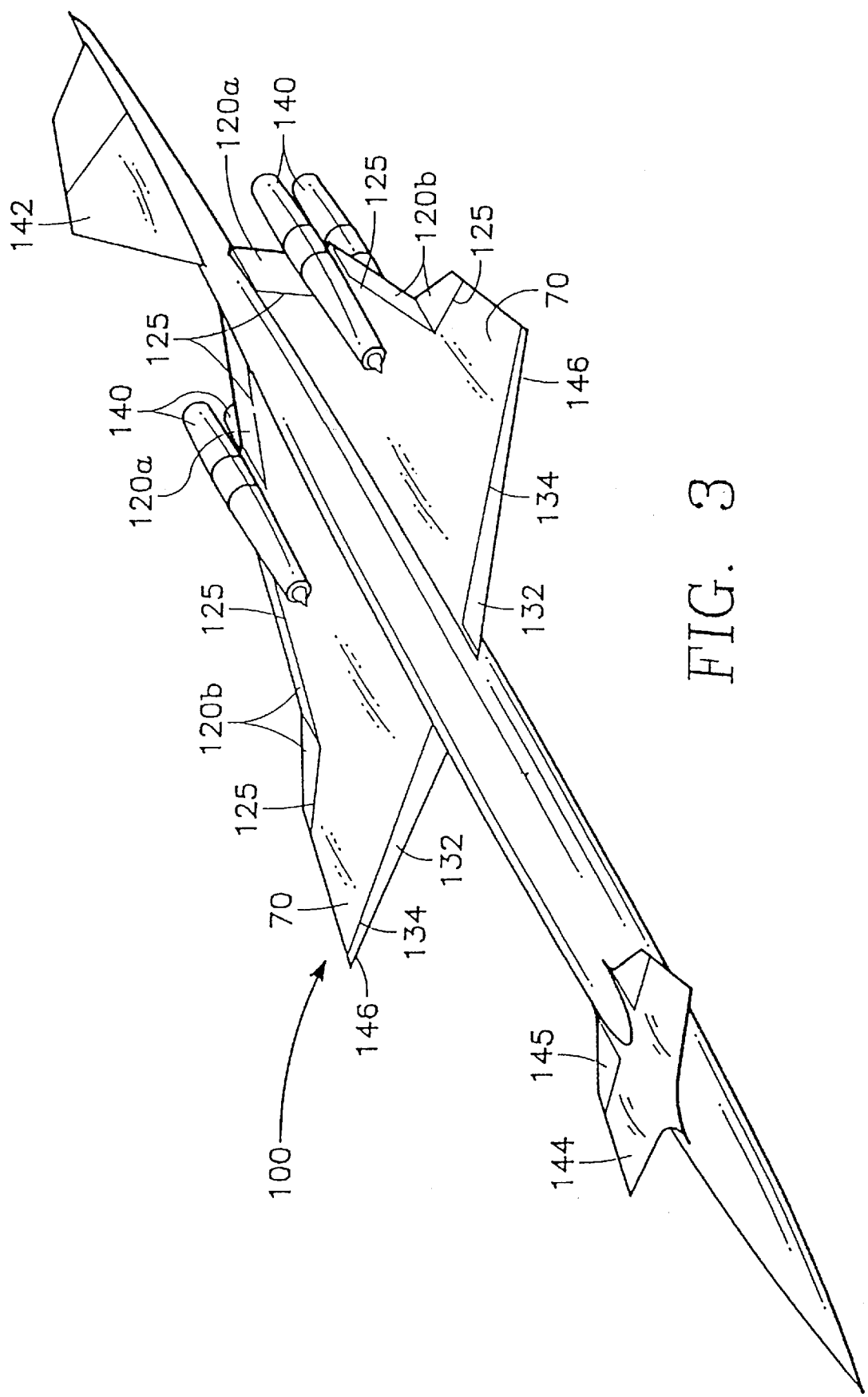
FIG. 3 is a simplified perspective view of a flight vehicle including a wing, plural engines, a canard, and a seamless leading edge flap.

Hence, the planform of a typical reverse delta wing 100 is related to the design cruise Mach number of the aircraft. The reverse delta wing 100 leading edge area 30 is shown in FIG. 1 to be straight or unswept. Small amounts of leading edge sweep (as shown in FIGS. 3, 4 and 5) broaden the definition of reverse delta wings 100 and have been found to be a generally favorable aerodynamic attribute.

At supersonic speeds, the boundary layer at the wing surface exhibits laminar flow starting at the leading edge area 30 and continuing for some fraction of the root chord of the wing 100 and terminating at an imaginary transition boundary line 40 shown in dashed line (which is not necessarily a straight line). Behind the transition boundary 40, air flow across the wing surface is turbulent. The region 50 of laminar flow contributes the lowest drag of any area of the wing 100. The region 60 of turbulent flow contributes the highest drag of any area of the wing 100 and therefore represents a significant limitation on lift-to-drag characteristics.

Reverse Delta Wing With Span Extensions

In accordance with a preferred embodiment of the invention, the drag due to lift of the basic reverse delta wing 100 is reduced by adding wing tip extensions. The wing tip extensions do not change the two-dimensional character of the flow which is characteristic of the basic reverse delta wing 100. Therefore, laminar flow is to be expected over these outboard wing panels. As illustrated in FIG. 1, reverse delta wing span extensions 70 extend span-wise to the left and right, respectively, in the laminar flow region 50 above the imaginary transition boundary 40. Thus, the wing span is extended to add wing area only in laminar flow regions 50 so that proportionately more of the total wing experiences laminar flow and less experiences turbulent flow.

A span extension of the basic reverse delta wing 100 is achieved by adding the small wing panels 70 whose leading edges 75 are extensions of the basic wing's leading edge area 30, whose side edges 80 are preferably, but not necessarily, parallel to the trailing edges 10. Angled secondary trailing edges 85 deviate between the trailing edges 10 and the side edges 80 and have a small to moderate sweep angle. A family of reverse delta wing planforms having such span extensions of varying span and area are illustrated in FIG. 2.

Figure 2:
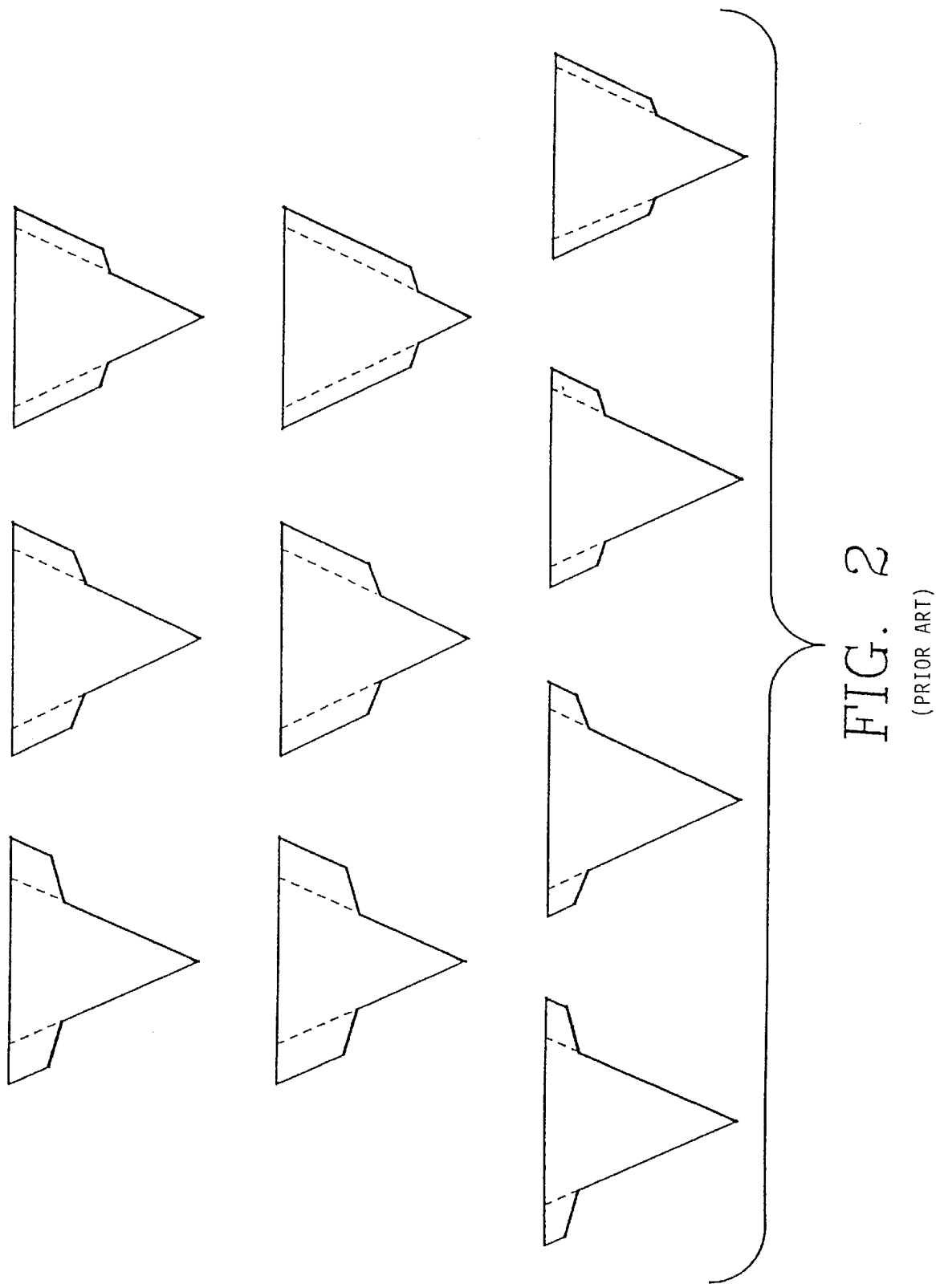
FIG. 2 includes diagrams of various reverse delta-wing configurations embodying the concept of FIG. 1.

It is clear that any number of additional wings can be obtained by interpolating between the planforms shown in FIG. 2 and by extrapolating wing planforms characterized by even higher values of $b_{tot}/b_{ref}$ and $S_{tot}/S_{ref}$. The ratio $S_{tot}/S_{ref}$ denotes the ratio of the total wing planform area to the area of the basic reverse delta wing 100. The ratio $b_{tot}/b_{ref}$ denotes the ratio of the total extended wing span to the span of the basic reverse delta wing 100. The wing planforms are shown with straight (unswept) leading edges. Planform variations featuring small positive or negative leading edge sweep angles (e.g., FIG. 3) are also feasible as these small deviations do not detract from the laminar flow advantages described above.

The purpose of the span extensions 70 is to increase the total wing span while minimizing the increase in total wing area. This increase in wing span (or aspect ratio) results in a decrease in drag-due-to-lift at subsonic speeds leading to improved takeoff and landing performance, better climb rates and increased subsonic cruise performance. The latter is essential for flight over land where supersonic flight is ruled out because of the sonic boom annoyance problem.

A significant feature is that the area of the wing span extensions 70 is added in the forward regions where natural laminar flow can be expected, thus increasing the percentage of the total wing area covered by laminar flow. Hence, on a wing of a given total area (producing a given amount of lift), the friction drag is further diminished over the (already low) friction drag of the basic reverse delta wing with natural laminar flow.

Leading Edge Flaps

As shown in FIG. 3 the reverse delta wing 100 has leading edge flaps 132 with leading edge hingelines 134. Working in conjunction with the trailing edge flaps 120a, 120b, the leading edge flaps 132 increase the maximum lift of the wing and improve static and dynamic stability. Leading edge flaps 132 also produce subsonic performance benefits by capturing leading edge thrust on the sharp-edged airfoil. The resulting lift-to-drag improvement increases subsonic cruise performance and also increases climb rate or reduces engine thrust requirements during climb-out.

Exemplary Airplane

FIG. 3 is a perspective view of an airplane, specifically a supersonic transport aircraft corresponding to the embodiment of a reverse delta wing 100 of the type shown in FIG. 1 with plural engines 140. FIG. 3 illustrates the placement of the jet engines 140, the trailing edge flaps 120a, 120b, the leading edge flaps 132, the hingelines 125, a stabilizing vertical tail 142, and a stabilizing canard surface 144.

The wing 100 can be a modified reverse delta planform with a reference area of the order of 8,000 square feet. The area of the wing 100 is determined by takeoff field length requirements. The wing 100 is preferably positioned at an incidence of 2 degrees with respect to the fuselage reference line and has 3 degrees of positive dihedral. The root airfoil section at the aircraft centerline has a nominal thickness of 3.75 percent. This tapers to 2.75 percent at the most outboard trailing-edge break. The aspect ratio of the wing 100 is nominally 2.35.

The effective camber of the wing 100 can be changed by deflecting leading and trailing The leading edge flap 120b. The leading edge flap 132 is a seamless flap 146 and is full span. The trailing edge flaps 120a, 120b consist of inboard and outboard segments 120a, 120b, respectively. The inboard segment 120a extends from the centerline to the engine nacelles and operates as a split flap beneath the fuselage. The outboard segment 120b extends from the engine nacelles to the trailing-edge break associated with span extensions which carry the ailerons. The trailing edge flaps 120a, 120b serve as high-lift and as pitch control devices.

The wing 100 and control surfaces (the vertical tail 142 and the canard surface 144) employ the concept of the reverse delta wing described above to promote the establishment of laminar flow over these surfaces. The wing 100 and the control surfaces 142, 144 are of low leading edge sweep with aerodynamically sharp forward edges and relatively low (on the order of 3 percent) thickness-to-chord ratios. The low sweep of the leading edge keeps spanwise flow to a magnitude which avoids boundary layer destabilization. Also, the outer surfaces of the wing 100 and the control surfaces 142, 144 are preferably very smooth so as to avoid bumps, steps, gaps, and waviness to avoid similar destabilization of the laminar boundary layer. In addition, the edges of wing 100 and the control surfaces 142, 144 are preferably sharp and thin to reduce the wave drag which occurs in supersonic flight.

FIG. 4 is a simplified side view of a supersonic transport aircraft including a wing 100, plural engines 140, and control surfaces 142, 144. As shown in FIG. 4, the plural jet engines 140 are placed one above the other (superposed). Their inlet flowfields are separated by the wing surface. This confers several benefits for an airplane cruising at supersonic speeds. For example, interactions between engines due to an "inlet unstart" are eliminated. Unstart occurs when a shock wave system used to slow the oncoming air to the engines 140 is expelled forward and outside a nacelle. The expelled shock wave can affect an adjacent engine unless barriers or adequate separation is provided. The wing 100 in this case provides the barrier.

Also, possible damage to the engines 140 by debris kicked up by the landing gear during takeoffs and landings is reduced because half of the engines 140 are above the wing 100, and as the underwing engines may be positioned further outboard of the main gear wheels. Further, the arrangement of FIG. 4 increases trailing-edge area 10 (of FIG. 1) which may be used for flaps, thus improving takeoff and landing performance. This is because more of the trailing edge of the wing is made available for control surfaces. Engine loads on each side of the airplane can be transferred to the fuselage by a single short wing box structure. Moreover, flyover noise from the upper pair of engines is partially shielded from the ground by the wing 100. Common inlet configurations on both upper and lower engine 140 operates at slightly different Mach numbers.

The nacelles are attached to short pylons designed to position their inlets just outside an assumed turbulent boundary layer at that chord location. Their fore-aft location places the maximum diameters of the engines at the wing trailing edge to minimize drag. This longitudinal location provides accessibility to the upper engine from outboard, and upper engine servicing may be further facilitated by deflecting the mid-span flap.

FIG. 5 is a top view of a flight vehicle including a wing 100, plural engines 140, a canard control surface 144, and a seamless leading edge flap 132. As shown in FIG. 5, in addition to the wing 100 stabilizing vertical tail 142, and plural engines 140, a canard pitch control surface 144 is also included as an integral part of the laminar supersonic transport aircraft of the present invention. Since the reverse delta wing 100 (similar to a delta wing) produces a strong downward flow aft of the wing 100 with large variations depending on vertical location, the contribution to stability that a conventional aft tail, located in this position, would provide is reduced. As a result the longitudinal position of the aircraft aerodynamic center (the point where the total lift force acts) shifts strongly as the aircraft accelerates from subsonic to supersonic speeds. This causes problems in balancing the aircraft and increases trim drag.

To solve this, a canard surface 144 is located in "clean air" in front of the wing 100 and avoids the degradation in effectiveness. Thus, the canard surface 144 produces a smaller aerodynamic center shift between subsonic and supersonic flight than a conventional horizontal tail. Although a canard can disturb engine operation, the canard 144 of the present invention is strategically located to prevent such disturbances. The canard 144 might disturb engine operation by creating a wake which could impinge on the wing 100 and destroy the desired laminar flow or be swallowed by the engine inlets. Therefore, the canard 144 of the present invention is preferably placed high on the fuselage, and set at a dihedral/angle so that its outboard tips are higher than its root section. As shown in FIG. 4, with the canard 144 in that position its wake will pass some distance above the wing 100 and not interfere with the attainment of laminar flow. In addition, the canard tip vortices pass above the upper engine inlets.

Primary pitch control is provided by the canard 144 mounted above the forward passenger cabin. The location of the canard 144 takes advantage of the strong frame supporting the nose landing gear. The canard 144 planform is similar to the reverse delta wing planforms and it, too, experiences significant areas of natural laminar flow. The surface is "all-moving" and a trailing edge flap 145 may be incorporated to enhance its effectiveness.

Referring to FIGS. 3–5, the leading edge 132 incorporates a seamless flap 146 on the wing 100. Because of the physically sharp leading edge necessary to minimize wave drag on the low sweep leading edge of the wing, the seamless flap 146 provides variable leading edge camber, to permit operation at higher lift coefficients and to achieve a drag reduction during takeoff and landing. The seamless flap 146 efficiently deflects the leading edge 132 of the wing 100 downward, aiding the airflow to negotiate the sharp leading edge without separating. Because laminar flow is established at the leading edge 132 of a laminar supersonic transport, the seamless flap 146 maintains surface smoothness when it is not in operation. Thus, the seamless flap produces a seamless deflecting surface and a very smooth surface to maintain natural laminar flow at cruise conditions. This effectively prohibits any surface steps or gaps in the area of desired laminar flow.

FIG. 6 illustrates one embodiment of the seamless flap 146. The seamless flap 146 comprises an upper surface 147 in the hinge region. The upper surface 147 of the flap 146 is a continuous surface which flexes to the deflected position, but does not stretch or compress during flap 146 extension. To avoid skin stretching, the pivot point is variable within a curved slot.

The flap 146 is seamless on the upper surface 147 only and a lower surface 148, has a sliding seal. The lower surface 148 incorporates an aft-facing blade seal 149 which slides along the lower wing surface in the vicinity of the flap 146 hingeline 134 as the flap 146 is deflected. Flap 146 deflections of up to 35 degrees are possible. In order to maintain laminar flow across the lower surface step, a laminar flow control suction strip 150 can be incorporated in the vicinity of the step. For example, a suction device for boundary layer control can be located in the vicinity of the seal to ensure that the laminar boundary layer can negotiate the rearward step of the sliding skin segment.

FIG. 7 illustrates another embodiment of the seamless flap 146. The embodiment of FIG. 7 achieves continuous upper 147 and lower 148 flap surfaces by employing a flap 146 which is split in the middle 152 into an upper section 154 and a lower section 156. The upper section 154 deflects about a flexible skin segment of the upper surface 147, while the lower section 158 deflects about a flexible lower surface 148 skin segment.

Relative motion between the upper and lower sections 154, 156 during flap deflection is accommodated by splitting the surface at the leading edge 132 and allowing each segment to slide along a central interface 152. The flap 146 upper and lower sections 154, 156 are attached to separate tracks and each section requires a separate actuation unit 159a, 159b. This allows preloading of the flap 146 sections against each other. While the flap 146 sections 154, 156 slide with respect to each other, the seals between the flap 146 structure and the wing 100 structure flex during flap 146 deflection. They can be bonded to the supporting structure because they do not have significant tension loading. The relative motion between upper and lower flap sections 154, 156 cause a step 160 to occur close to the leading edge 132 when the flap 146 is deflected. There is no step at supersonic cruise, as the flap 146 is undeflected at that condition.

Laminar Flow Control By Cooling

It is known that cooling the surface over which a laminar boundary flows helps stabilize the boundary layer. The absence of significant spanwise crossflow on the wing of the present laminar supersonic transport aircraft promotes the application of a thermal laminar flow control (TLFC). Thus, TLFC is rather ineffective when boundary layer crossflow is present as in the case of a regular delta wing.

The attractiveness of TLFC in application to a supersonic aircraft (at Mach numbers of approximately 2.4 and higher), derives from the confluence of two circumstances: 1) aerodynamic heating elevates the external skin temperature of the airframe; and 2) the availability of a heat sink in form of jet fuel, which is abundant and at sufficiently low temperatures. As a result, the aircraft's fuel can be used directly as a coolant at its normal temperature to avoid the need for an active refrigeration system to cool the coolant.

In contrast, at Mach number less than 2.4, the external skin temperature of the airframe due to aerodynamic heating will be relatively lower. Therefore, in order to achieve a proper temperature ratio between the uncooled skin and cooled skin, the temperature of the coolant must be lower than the normal fuel temperature. As such, an active refrigeration system must be used to cool the coolant. Suitable environmental control systems with a conventional thermodynamic refrigeration cycle can be used. Numerous coolants can be used in the active refrigeration cooling system, such as helium, glycol or the aircraft's fuel, as long as the fuel is cooled below the normal fuel temperature.

Consequently, cooling of large wing skin areas using jet fuel is manageable for Mach numbers above 2.4, as the skin temperature reduction required for boundary layer stabilization is modest. The thermal energy to be transferred through the wing skin is also fairly small. This is a result of the low heat transfer coefficients existing in the presence of a laminar boundary layer which are an order of magnitude smaller than the coefficients for a turbulent boundary layer.

FIG. 8 illustrates one embodiment of a cooling system used in accordance with the present invention. Skin surfaces 200 of metallic (aluminum/titanium) wings can be cooled by a bonded cooling plumbing system. As shown in FIG. 8, liquid or gaseous cooling fluid 204 (any suitable coolant) flows through a network of tubes 206 attached (preferably bonded) to an inside surface 208 of wing skins 200. The cooling tubes 206 preferably span in a chordwise direction along the wing 202. In addition, the cooling tubes 206 are preferably cross-connected (not shown) at chordwise intervals by headers (not shown) stretching in a spanwise direction. The cooling tubes 206 are preferably 0.25 inches in diameter and spaced approximately 3 to 6 inches apart.

FIG. 9 illustrates a second embodiment of a cooling system used in accordance with the present invention. Skin surfaces 210 of a sandwich structure comprising structural skins 212 sandwiching a core matrix 216 can be cooled by an alternate embedded cooling plumbing system. As shown in FIG. 9, cooling tubes 218 are embedded into the core matrix 216 and are attached to facing portions of the structural skins 212, respectively. As a result, the heat transfer distance between the coolant and the air stream is minimized.

In addition, similar to the embodiment of FIG. 8, the cooling tubes 218 preferably span in a chordwise direction along the wing 200, the cooling tubes 218 are preferably cross-connected (not shown) at chordwise intervals by headers (not shown) stretching in a spanwise direction, and cooling fluid 204 (any suitable coolant) flows through the cooling tubes 218.

The approaches in FIGS. 8 and 9 when used in conjunction with composite skin surfaces 222 of FIG. 10 are less practicable because the low heat conductivity of composite materials resist heat transfer through the wing's 222 skin.

FIG. 10 illustrates a third embodiment of a cooling system used in accordance with the present invention. Skin surfaces 222 constructed of composite materials can be cooled by a laminate and hollow fiber/micro fiber cooling system.

For the composite skin 222 of FIG. 10, a laminate parasitic outer cover 224 and hollow fiber/micro fiber cooling system is employed. The laminate outer cover 224 is parasitic (it is not a load bearing structure) and preferably is a thin heat transfer laminate. The hollow fibers 226, such as hollow glass or quartz fibers, are embedded in the laminate outer cover 224 and bonded to a facing surface or outer surface 228 of the composite skin 222. Cooling fluid 204 (any suitable coolant) flows through the hollow fibers 226. When bonded to the outer skin surface 228 of the composite skin 222, the heat transfer laminate 224 provides a very short thermal path between airflow and coolant. It should be noted that the size of the hollow fibers 226 can vary in size.

Referring to FIGS. 8–10, the heat absorbed by the coolant 204 is dumped into a heat sink which preferably consists of the fuel stream feeding the engines. As a result, the fuel remaining in the fuel tanks stays fairly constant and at a temperature level close to loading conditions. A fuel reservoir temperature of less than about 100 degrees F is sufficiently low to enable skin cooling at flight Mach numbers greater than approximately 2.4. At lower Mach numbers (lower than 2.4), because of reduced external skin temperatures from aerodynamic heating, the coolant temperature may have to be reduced by an active refrigeration system.

In addition to acting as the heat sink, the jet fuel can also be used as coolant running through the skin cooling tube network. Alternatively, the coolant may consist of an inert liquid or gas contained in a closed-loop circuit which is thermally connected to the jet fuel by means of a heat exchanger.

The coolant flows from the wing's 100 trailing edges 10 toward the leading edge area 30 of FIG. 1, i.e., in direction opposite to the airflow over the wing 100. This configuration represents a counterflow heat exchanger which is characterized by its maximum thermal efficiency. As the coolant flows forward and absorbs heat, its temperature rises. As a result, a chordwise temperature distribution is achieved which is very favorable in stabilizing laminar boundary layers. Thus, the system provides the desired favorable surface temperature gradients at minimized thermal energy transfer.

While the invention has been described in detail by specific reference to preferred embodiments, variations and modifications thereof may be made without departing from the true spirit and scope of the invention.

What is claimed is:

1. A laminar supersonic transport aircraft having a forward section and a distal end, comprising:

a reverse delta wing located between said forward section and said distal end of said aircraft;

a first set of at least two jet engines located on a top surface of said reverse delta wing;

a second set of at least two jet engines superposed to said first set of at least two jet engines on a bottom surface of said reverse delta wing;

a stabilizing vertical tail located near said distal end of said aircraft; and a stabilizing canard surface located near said forward section of said aircraft.

2. The invention as set forth in claim 1, wherein said reverse delta wing comprises:

a basic reverse delta wing aerodynamic wing portion bounded by a leading edge and by a pair of trailing edges extending from respective ends of said leading edge toward a trailing apex point; and respective span-wise wing extensions extending chord-wise from said leading edge by a fraction of the chordlength of said wing and extending span-wise from opposing sides of said wing.

3. The invention of claim 2 wherein a spanwise forward portion of said wing experiences natural laminar boundary layer flow during flight and a spanwise aft portion of said wing does not generally experience natural boundary layer flow during flight, and wherein a major portion of said span-wise wing extensions are located within said spanwise forward portion of laminar boundary layer flow.

4. The invention as set forth in claim 3 further comprising a laminar flow control device for artificially inducing laminar flow in said aft portion of said wing.

5. The invention as set forth in claim 2 wherein said trailing edges having aft portions thereof, the aft portions extending toward a point which is closer to said leading edge than said apex point, whereby to minimize surface area of said wing outside of said forward portion of laminar boundary layer flow.

6. The invention as set forth in claim 2 wherein a portion of said wing contiguous with said trailing edges comprises plural trailing edge flaps, and further comprising:

respective hingelines at which respective ones of said flaps are rotatably connected to a remainder of said wing, said hingelines extending generally span-wise relative to said wing.

7. The invention as set forth in claim 2 wherein each of said trailing edges comprises plural steps, each of said steps comprising a span-wise trailing edge and a chord-wise side edge.

8. The invention as set forth in claim 7 further comprising respective flaps comprising respective ones of said steps.

9. The invention as set forth in claim 8 further comprising respective hingelines at which respective flaps are rotatably mounted on the remaining portion of said wing.

10. The invention as set forth in claim 2, wherein said leading edge is a seamless leading edge flap.

11. The invention as set forth in claim 10, wherein said seamless flap comprises a seamless continuous upper surface capable of deflecting but not stretching or compressing during flap extension.

12. The invention as set forth in claim 11, wherein said seamless flap comprises a lower surface with a sliding seal.

13. The invention as set forth in claim 12, wherein said lower surface has an aft-facing blade seal which slides along said lower surface as said flap is deflected.

14. The invention as set forth in claim 12, wherein said lower surface includes a laminar flow control suction strip for maintaining laminar flow across said lower surface.

15. The invention as set forth in claim 14, wherein said laminar flow control suction strip is a suction device for boundary layer control and is located near said sliding seal.

16. The invention as set forth in claim 10, wherein said seamless flap comprises seamless continuous upper and lower surfaces.

17. The invention as set forth in claim 16, wherein said seamless continuous upper and lower surfaces are defined by a split in a middle section of said flap.

18. The invention as set forth in claim 17, wherein said seamless continuous upper surface is capable of deflecting about a flexible skin segment of said upper surface and said lower surface is capable of deflecting about a flexible lower surface skin segment.

19. The invention as set forth in claim 16, wherein said seamless continuous upper and lower surfaces includes a central interface between said upper and lower surfaces for allowing relative motion between said upper and lower surfaces during flap deflection.

20. The invention as set forth in claim 19, wherein said seamless continuous upper and lower surfaces are attached to separate tracks and each section requires a separate actuation unit for allowing preloading of said upper and lower surfaces against each other.

21. The invention as set forth in claim 20, wherein said seamless continuous upper and lower surfaces are adapted to slide with respect to each other.

22. The invention as set forth in claim 2, wherein said leading edge is a seamless flap for providing a variable leading edge camber to said reverse delta wing for permitting operation of said aircraft at higher lift coefficients and for achieving a drag reduction during takeoff and landing of said aircraft.

23. The invention as set forth in claim 2, wherein said leading edge is a seamless flap for efficiently deflecting said leading edge of said reverse delta wing downward for aiding airflow so as to negotiate said leading edge without separating.

24. The invention as set forth in claim 2, wherein said leading edge is a seamless flap for producing a seamless deflecting and smooth surface for maintaining natural laminar flow at cruise conditions to effectively eliminate surface steps or gaps in areas of desired laminar flow.

25. The invention as set forth in claim 1, wherein said second set of at least two engines are located symmetrically facing and adjacent to said first set of plural engines on said bottom surface of said reverse delta wing.

26. A laminar supersonic transport aircraft having a forward section and a distal end, comprising:
  a major reverse delta wing portion located between said forward section and said distal end of said aircraft;
  a first set of at least two jet engines located on a top surface of said reverse delta wing;
  a second set of at least two jet engines superposed to said first set of at least two jet engines on a bottom surface of said reverse delta wing;
  a stabilizing vertical tail located near said distal end of said aircraft;
  a stabilizing canard surface located near said forward section of said aircraft; and
  a laminar flow control device comprising a network of cooling tubes attached to an inside underneath surface of said reverse delta wing portion with a suitable coolant flowing through said cooling tubes.

27. The invention as set forth in claim 26, wherein said coolant is a liquid cooling fluid.

28. The invention as set forth in claim 26, wherein said coolant is a gaseous fluid.

29. The invention as set forth in claim 26, wherein said cooling tubes span in a chordwise direction along said reverse delta wing.

30. The invention as set forth in claim 26, wherein said cooling tubes are 0.25 inches in diameter and spaced approximately at least 3 inches apart and not greater than 6 inches apart.

31. The invention as set forth in claim 26, wherein said reverse delta wing is comprised of a sandwich structure comprising structural skins sandwiching a core matrix and wherein said laminar flow control device is a cooling plumbing system embedded into said core matrix and attached to facing portions of said structural skins, respectively, and comprising cooling tubes with a suitable coolant flowing through said cooling tubes so that heat transfer distance between said coolant and an air stream is minimized.

32. The invention as set forth in claim 31, wherein said coolant is a liquid cooling fluid.

33. The invention as set forth in claim 31, wherein said coolant is a gaseous fluid.

34. The invention as set forth in claim 31, wherein said cooling tubes span in a chordwise direction along said reverse delta wing.

35. The invention as set forth in claim 31, wherein said coolant is the aircraft's fuel.

36. The invention as set forth in claim 31, wherein said coolant flows from said trailing edge toward said leading edge in a direction opposite to airflow over said reverse delta wing.

37. The invention as set forth in claim 26, wherein said laminar flow control device is a cooling system comprising a laminate parasitic outer cover and a plurality of hollow fibers embedded in said laminate outer cover and attached to a facing outer surface of said reverse delta wing, wherein said hollow fibers have a suitable coolant flowing through said hollow fibers so that said laminate parasitic outer cover provides a short thermal path between airflow and said coolant.

38. The invention as set forth in claim 37, wherein said laminate parasitic outer cover is a thin heat transfer laminate.

39. The invention as set forth in claim 37, wherein said hollow fibers are hollow glass fibers.

40. The invention as set forth in claim 37, wherein said hollow fibers are quartz fibers.

41. The invention as set forth in claim 37, wherein said coolant is a liquid cooling fluid.

42. The invention as set forth in claim 37, wherein said coolant is a gaseous fluid.

43. The invention as set forth in claim 37, wherein said cooling tubes span in a chordwise direction along said reverse delta wing.

44. The invention as set forth in claim 37, wherein said coolant is the aircraft's fuel.

45. The invention as set forth in claim 37, wherein said coolant flows from said trailing edge toward said leading edge in a direction opposite to airflow over said reverse delta wing.

46. The invention as set forth in claim 26, wherein said coolant is the aircraft's fuel.

47. The invention as set forth in claim 26, wherein said coolant flows from said trailing edge toward said leading edge in a direction opposite to airflow over said reverse delta wing.

48. A laminar supersonic transport aircraft having a forward section and a distal end, comprising:

a major reverse delta wing portion located between said forward section and said distal end of said aircraft;

a plurality of jet engines on a top surface of said reverse delta wing portion and a plurality of superposed jet engines on a bottom surface of said reverse delta wing portion;

a stabilizing vertical tail located near said distal end of said aircraft;

a stabilizing canard surface located near said forward section of said aircraft; and a laminar flow control device comprising a network of cooling tubes attached to an inside underneath surface of said reverse delta wing portion with a suitable coolant flowing through said cooling tubes.

49. The invention as set forth in claim 48, wherein said major reverse delta wing portion is bounded by a leading edge and by a pair of trailing edges, said trailing edges comprising:

(a) forward trailing edge portions extending from respective ends of said leading edge toward a trailing apex point; and (b) aft trailing edge portions extending from aft ends of respective forward trailing edge portions toward a point which is closer to said leading edge than said apex point.

50. The wing of claim 49 wherein said aft trailing edge portions coincide with a region of said wing which is generally not subject to natural laminar boundary layer flow.

51. The wing of claim 49 wherein a portion of said wing contiguous with said trailing edges comprises plural trailing edge flaps, and further comprising:

respective hingelines at which respective ones of said flaps are rotatably connected to a remainder of said wing, said hingelines extending generally span-wise relative to said wing.

52. The wing of claim 49 wherein each of said trailing edges comprises plural steps, each of said steps comprising a span-wise trailing edge and a chord-wise side edge.

53. The wing of claim 52 further comprising respective flaps comprising respective ones of said steps.

54. The wing of claim 53 further comprising respective hingelines at which respective flaps are rotatably mounted on the remaining portion of said wing.

55. The invention as set forth in claim 49, wherein said reverse delta wing portion is comprised of a sandwich structure comprising structural skins sandwiching a core matrix and wherein said laminar flow control device is a cooling plumbing system embedded into said core matrix and attached to facing portions of said structural skins, respectively, and comprising cooling tubes with a suitable coolant flowing through said cooling tubes so that heat transfer distance between said coolant and an air stream is minimized.

56. The invention as set forth in claim 49, wherein said laminar flow control device is a cooling system comprising a laminate parasitic outer cover and a plurality of hollow fibers embedded in said laminate outer cover and attached to a facing outer surface of said reverse delta wing, wherein said hollow fibers have a suitable coolant flowing through said hollow fibers so that said laminate parasitic outer cover provides a short thermal path between airflow and said coolant.

\* \* \* \* \*